Figure 1:
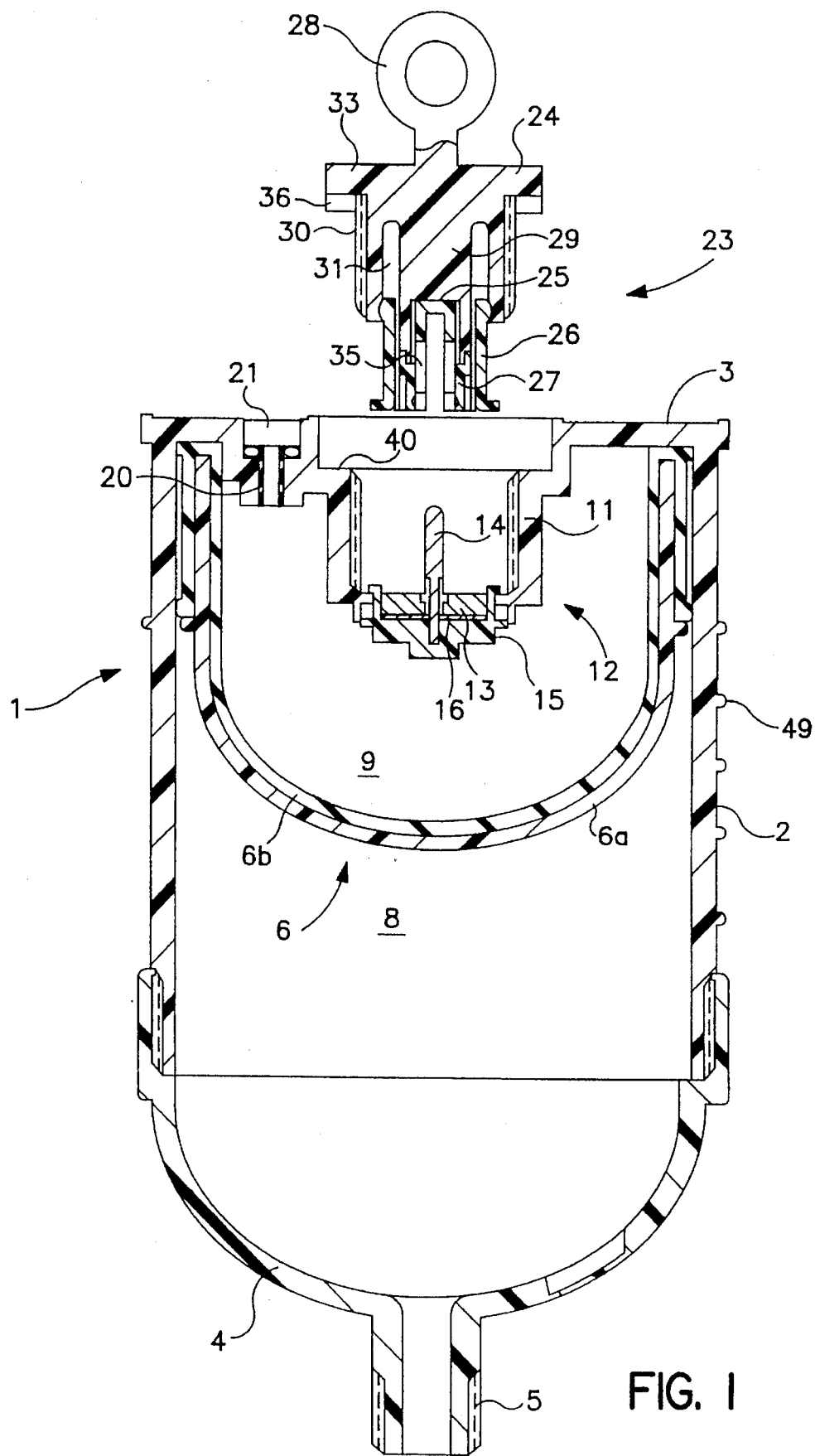

United States Patent [19]

Patterson

[11] Patent Number: 5,460,243

[45] Date of Patent: Oct. 24, 1995

[54] DISPENSING DEVICE

[76] Inventor: Denis A. J. Patterson, Longdom Heath Lodge, Upton-Upon-Severn, Worcestershire WR8 Onu, United Kingdom

[21] Appl. No.: 244,088

[22] PCT Filed: Nov. 20, 1992

[86] PCT No.: PCT/GB92/02153

§ 371 Date: May 16, 1994

§ 102(e) Date: May 16, 1994

[87] PCT Pub. No.: WO93/10391

PCT Pub. Date: May 27, 1993

[30] Foreign Application Priority Data

Nov. 22, 1991 [GB] United Kingdom ............... 9124809
May 19, 1992 [GB] United Kingdom ............... 9210672

[51] Int. Cl.⁶ ........................... F16N 11/10; F16N 13/16
[52] U.S. Cl. .................................. 184/29; 222/389
[58] Field of Search ................. 184/29, 39; 222/389

[56] References Cited

U.S. PATENT DOCUMENTS

| | | | |
|---|---|---|---|
| 3,430,731 | 3/1969 | Satzinger et al. | |
| 3,842,939 | 10/1974 | Satzinger | 184/39 |
| 3,983,959 | 10/1976 | Satzinger | 184/39 |
| 4,306,001 | 12/1981 | Brown. | |

FOREIGN PATENT DOCUMENTS

| | | | |
|---|---|---|---|
| 0209926 | 1/1987 | European Pat. Off. . | |
| 2431552 | 9/1975 | Germany . | |
| 2652513 | 7/1977 | Germany . | |
| 1102666 | 2/1968 | United Kingdom | 184/39 |

Primary Examiner—Thomas E. Denion
Attorney, Agent, or Firm—Howson and Howson

[57] ABSTRACT

A dispensing device (50) for dispensing fluent material, e.g. a lubricant, over a prolonged period of time comprising a cylinder (2), a piston (6) and/or extendable membrane separating the cylinder into a fluent material containing first chamber (69) and a second electrolyte containing chamber (9), a sacrificial first electrode (61), a gas-releasing second electrode (63) connected to the first electrode, the electrodes not being in contact with the electrolyte prior to activation of the device, and means for adjusting the surface area of the second electrode which will be exposed for contact with the electrolyte on activation of the device. A method of lubricating a machine bearing is also disclosed.

27 Claims, 11 Drawing Sheets

DISPENSING DEVICE

This invention relates to a dispensing device of the kind comprising a cylinder, dispensing means (e.g. a piston device, an extendable membrane or a combination of a piston and an extendable membrane) movable within the cylinder and separating the cylinder into a first chamber containing fluent material and having a discharge outlet and a second chamber containing an electrolyte, a sacrificial first electrode, a gas-releasing second electrode electrically connected to the first electrode, the first and second electrodes being of different gavanically active materials, e.g. metallic or carbon, and which, on activation of the device, are brought into contact with the electrolyte so as to electrochemically generate gas within, and increase the pressure within, said second chamber thereby causing the dispensing means to move within the cylinder to discharge said fluent material through the discharge outlet. The invention primarily relates to lubricant dispensing devices which are mounted on machinery and dispense lubricant into lubricating channels of bearings of the machinery at a steady rate over a prolonged period of time, e.g. from one to twelve months. However the invention may also find application in the automatic dispensing over a period of time of other types of fluent material, such as other liquids, pastes, gels or even powder material. The invention also relates to a method of dispensing fluent material at a controlled rate over a period of time.

A known dispensing device of the kind referred to for dispensing lubricant is described in GB-A-1401535. In this known device the first and second electrodes are formed as a bi-polar galvanic element which is initially contained in a third chamber separated from the second chamber by a common frangible wall. A separate screw-threaded activating member is inserted into the third chamber and, on being turned, pushes the galvanic element against the common frangible wall fracturing the latter and pushing the galvanic element into the electrolyte contained in the second chamber. The second chamber has flexible, elastomeric walls and a piston device and, as gas is electrochemically generated, the second chamber expands moving the piston device towards the discharge outlet. Such known dispensing devices are well proven in practice and the means for activating the device to initiate and preserve the steady electrochemical generation of gas has been both accurately predictable and reliable. However there is a disadvantage with such known dispensing devices in that the rate of discharge of lubricant from the discharge outlet is determined by the construction of the galvanic element and in particular is dependent on the exposed surface area of the gas-releasing electrode which contacts the electrolyte. These galvanic elements are sealed into the dispensing devices during manufacture and cannot be changed or replaced after manufacture. It is thus necessary for manufacturers to make, and for distributors and purchasers to stock, a range of devices which are able to discharge lubricant at a steady rate over different periods of time, e.g. from one to twelve months.

In order to overcome the above-identified disadvantage, it has been proposed in WO-A-8909907 to modify the design of dispensing device shown in GB-A-1401535 by incorporating the galvanic element in a cavity within the screw-threaded activating member which is sealed by a destructible or soluble foil. In use, the screw-threaded member is screwed into the third chamber causing both the destructible or soluble foil which seals the cavity and the common frangible wall to break so that the galvanic element is released into the electrolyte contained in the second chamber. In practice the destructible or soluble foil has been dispensed with and the activating-member has mechanical claws which grip the galvanic element until the activating member is screwed home. In both these devices a common electrolyte containing body part can be used with any one of a plurality of different screw-threaded members incorporating different galvanic elements. Although these arrangements dispense with the need to make and stock a complete range of complete dispensing devices, it is still necessary for a manufacturer to make, and distributors and users to stock, a range of different screw-threaded members incorporating different galvanic elements. Since the galvanic element is a relatively costly part of a dispensing device, the economic benefits to be obtained by these arrangements are limited.

Another known lubricant dispensing device which is available on the market is disclosed in EP-A-0278138. This known device employs conventional torch batteries for passing current through an electrolyte to generate gas within an expansible chamber. As the latter expands with the generation of gas, a piston moves and expels lubricant from a discharge outlet of the device. A complicated electrical system of switches and resistors is provided for setting, and if necessary adjusting, the rates of gas generation and lubricant dispensing. With such a design it is not necessary to provide an entire range of different dispensing devices. However, this known dispensing device has the disadvantages that it is relatively expensive to produce, because of its complicated electrical equipment, and could prove unreliable in use because of the inherent fallibility of electrical circuit assemblies including the batteries when used over extended periods.

Various other lubricant dispensing devices have been proposed which incorporate electrical means for generating gas, for switching the reaction on or off and/or for altering the lubricant discharge rate whilst in use. Examples of such devices are shown in WO-A-8800657, WO-A-8804751 and WO-A-8908800. However all these dispensing devices have the disadvantages of the relatively high cost and inherent fallibility of complicated electrical apparatus when used over extended periods.

The present invention seeks to overcome the disadvantages discussed above by providing a dispensing device in which gas generation is achieved by the well proven method of bringing galvanically dissimilar metals or other materials into contact with an electrolyte and in which means are provided for selecting, typically pre-selecting, the rate of discharge of fluent material, typically a lubricant, from the device.

According to one aspect of the present invention a dispensing device of the kind referred to is characterised in that the dispensing device further comprises adjusting means for adjusting the amount of surface area of the second electrode exposed for contact with said electrolyte on activation of the device.

A dispensing device according to the invention employs a reliable, well proven method of generating gas in which the rate of discharge of fluent material through the discharge outlet can be selected as required, typically prior to activation of the device, by adjusting the amount of the surface area of the second electrode exposed for contact with the electrolyte. It is therefore not necessary for manufacturers to produce, or for distributors and users to stock, a range of dispensing devices having different operating or lubricating periods. Instead a single type of dispensing device is provided which can be adjusted by the user to operate for a desired period of time to suit a particular requirement.

The dispensing means typically comprise a piston device but could, alternatively, comprise an expansible membrane or a combination of a piston device and an expansible membrane.

Conveniently the adjusting means comprises an adjustment member movably, preferably turnably, mounted in an end wall of the cylinder remote from the discharge outlet and in that the first and second electrodes are carried by an electrode unit having relatively movable., preferably relatively turnable relative to a turning axis, first and second housing parts movable to expose different amounts of the surface area of the second electrode, the electrode unit being positioned, prior to activation of the device, in an adjustment position in which electrolyte in the second chamber is prevented from contacting the first or second electrode and in which the adjustment member is movable, preferably turnable, to relatively move, preferably turn, said housing parts to adjust the amount of the surface area of the second electrode exposed for contact with the electrolyte on subsequent activation of the dispensing device. Suitably said housing parts are relatively turnable about a turning axis and define a sealed cavity with an opening therein coaxial with the turning axis, the second electrode being movably mounted in the sealed cavity and projecting through the opening, the amount that the second electrode projects through said opening being adjustable by turning of said adjustment member.

As an alternative construction the first and second housing parts of the electrode unit may cover the second electrode, the first housing part having a plurality of openings therein and the second housing part having at least one opening therein, the turning of the adjustment member causing the first and second housing parts to turn relative to each other to place different opening of the first and second housing parts in registry with each other to expose different parts of the surface area of the second electrode. Typically the housing parts include concentric cylindrical parts or coaxial flat parts in sliding, turnable relationship with each other.

In an alternative construction incorporating an electrode unit, the electrode unit, prior to activation of the device, is detachably fixed in, so as to block, a tubular passage opening into the second chamber and the adjusting means comprises a plug carrying a covering member, the plug being insertable into the tubular passage to plug the latter, to position the covering member so as to partially cover an exposed surface of the second electrode and to dispense the electrode into the second chamber. Suitably the tubular passage and plug are provided with mating screw-threads, the plug being screwed into and out of the tubular passage. In the electrode unit, the second electrode is preferably of elongate, cylindrical form positioned coaxially with the tubular passage when the electrode unit is fixed in the tubular passage prior to activation of the device. In this case the covering member comprises a sleeve which is pushed on to the elongate electrode as the plug is inserted into, e.g. screwed into, the tubular passage. By providing a number of plugs each carrying a differently sized sleeve, the amount of surface area of the second electrode remaining exposed after a sleeve has been pushed onto it can be pre-selected. In use the plug is inserted, e.g. screwed, downwardly into the tubular passage so that the sleeve is initially pushed onto the upwardly projecting second electrode. In the final stage of plug insertion, the electrode unit is pushed into the second chamber. The plug blocks the tubular passage in its fully inserted position to prevent the electrolyte from escaping from the second chamber. A sealing ring is suitably provided for sealing between the tubular passage and the plug when the latter is in its fully inserted position. Although a number of plugs need to be provided for each dispensing device, these plugs are made from inexpensive plastics mouldings and are relatively inexpensive to make. The relatively expensive galvanic element is contained in the main unit of the dispensing device.

In an alternative embodiment the second chamber may be divided into a first sub-chamber containing the electrolyte and a second sub-chamber adjacent the piston device, the first and second sub-chambers being separated by a dividing wall which during use enables the passage therethrough of gas (e.g. it is gas permeable) but prevents the passage therethrough of liquid electrolyte (i.e. it is electrolyte impermeable). In this case the dividing wall is conveniently rigid or semi-rigid. Typically the dividing wall is substantially gas-impermeable but is provided with a number of spaced apart gas-permeable portions. However, alternatively, the dividing wall may be completely gas-permeable. In this embodiment the discharge rate of the dispensing device may be re-adjusted or re-set after activation of the device.

In another embodiment, in which the electrodes comprise an electrode unit, the second electrode may be of elongate form projecting into the second chamber and the first electrode may be fixed to a free end portion of the second electrode which projects into the second chamber. Turning of the adjusting means adjusts the surface area of the second electrode exposed to contact with the electrolyte. As with the previously described embodiment, the discharge rate may be re-set after initial activation of the device. The second electrode may include a cylindrical portion slidable within electrolyte sealing means, e.g. an O-ring or the like. Alternatively, instead of the first electrode being fixed to the second electrode, the first electrode may be fixed in an end wall of the device and the second electrode mounted for movement relative thereto on turning of the mechanical means to adjust the amount by which the second electrode projects into the second chamber. In this case the adjusting means may comprise a screw-threaded portion of the second electrode rotatable to vary the amount that the second electrode projects into the second chamber. Suitably the first electrode is in the form of an annular disc through which the second electrode movably projects and a cover member is mounted on the free end of the second electrode which covers the first electrode when the second electrode is in a limit position.

In a further embodiment, the second electrode may be movably mounted in a wall of the device at an angle to the axis of the cylinder. In this case the adjusting means may include a bevel gear and toothed track on the circumference of a circle centred on the cylinder axis, the teeth of said track engaging with the bevel gear for effecting movement of the second electrode. Again the rate of gas discharge can be re-adjusted or re-set after initial activation of the dispensing device.

The first and second electrodes may be made of any suitable galvanically active metallic or other materials. For example the first electrode may comprise zinc or aluminium and the second electrode may comprise molybdenum or stainless steel. Carbon is one example of a non-metallic, galvanically active material.

According to another aspect of the present invention there is provided a method of lubricating a machine bearing as claimed in the ensuing claim 25.

Figure 2:
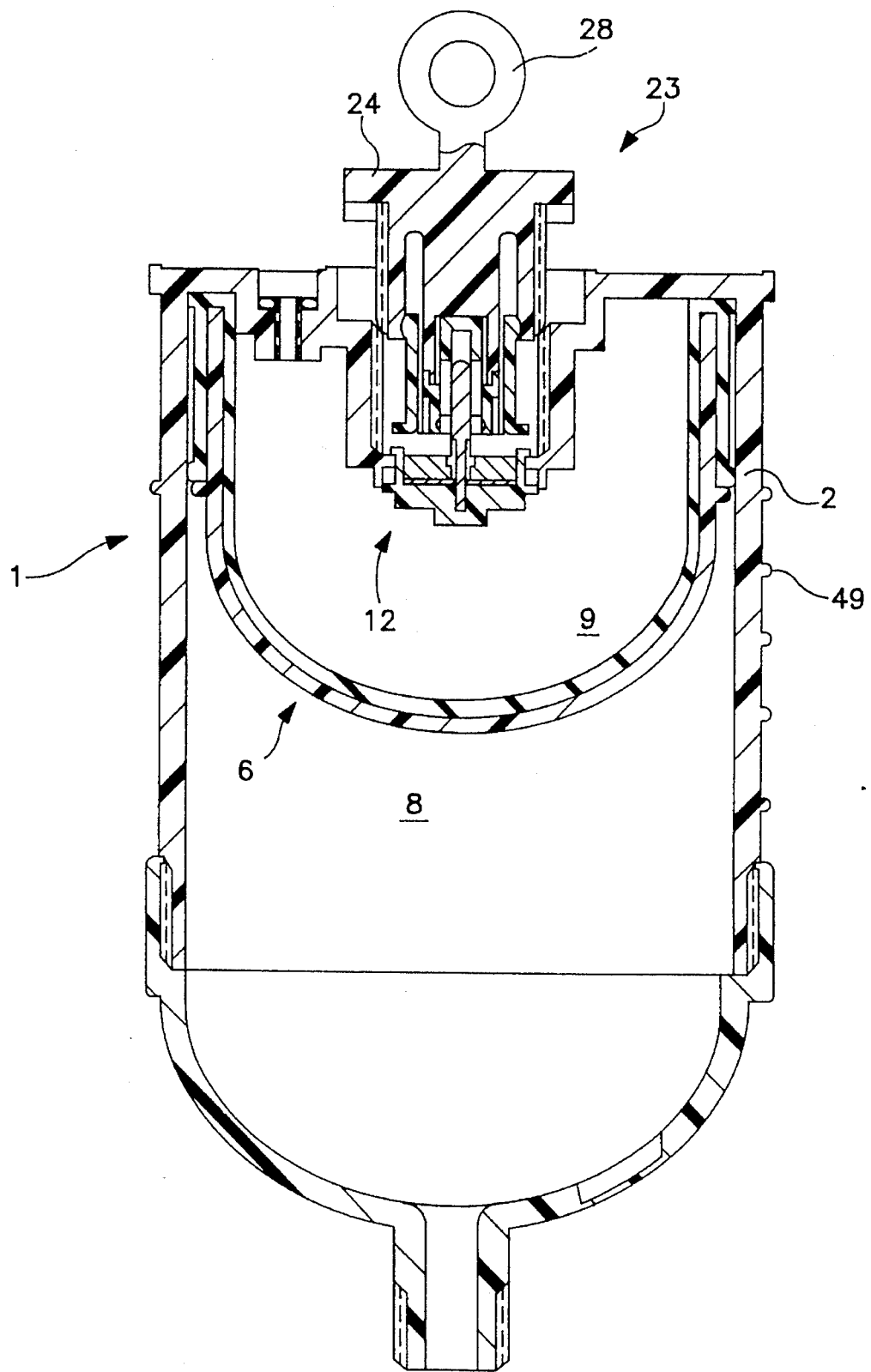
Figure 3:
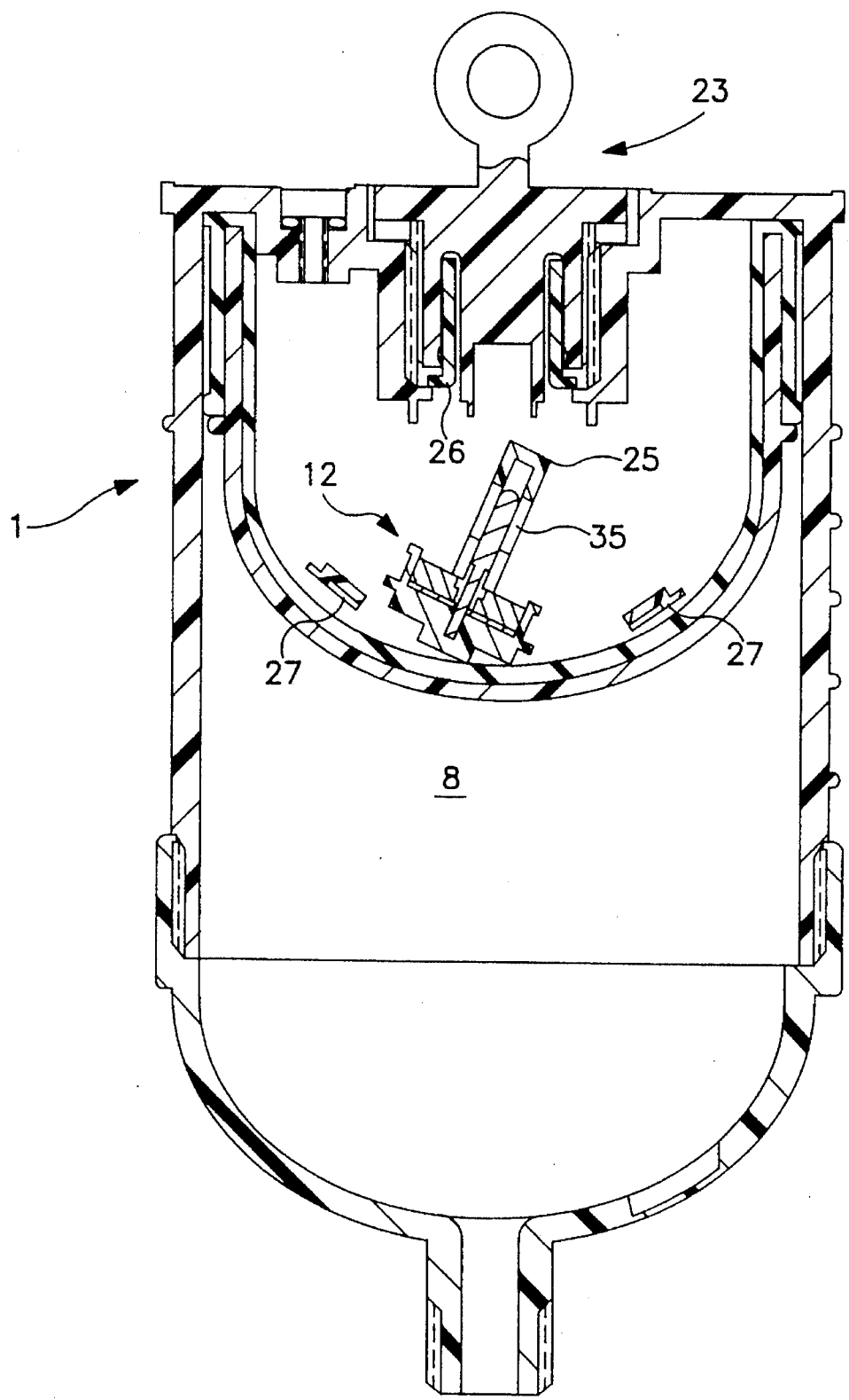
Figure 4:
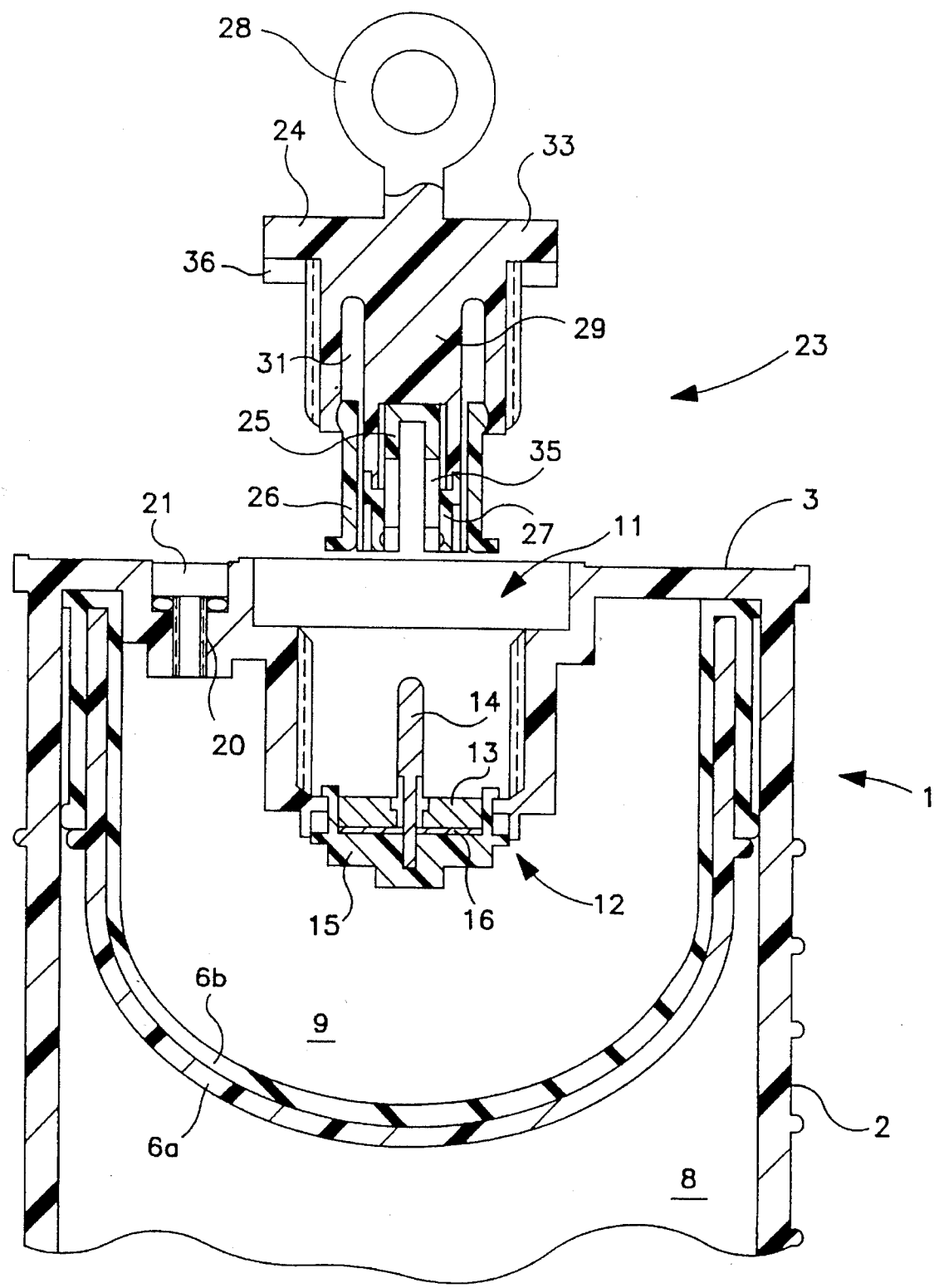
Figure 5:
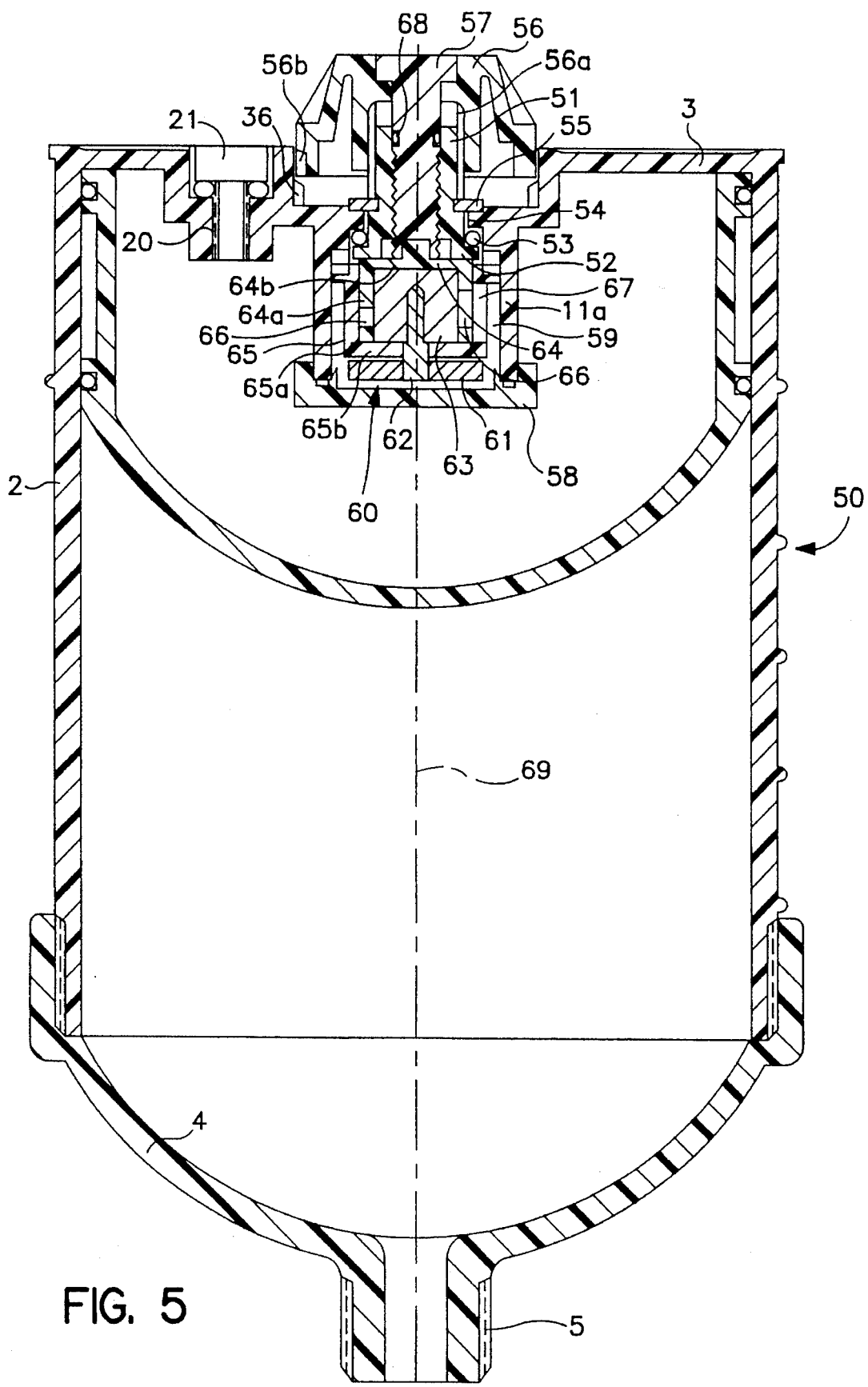
Figure 6:
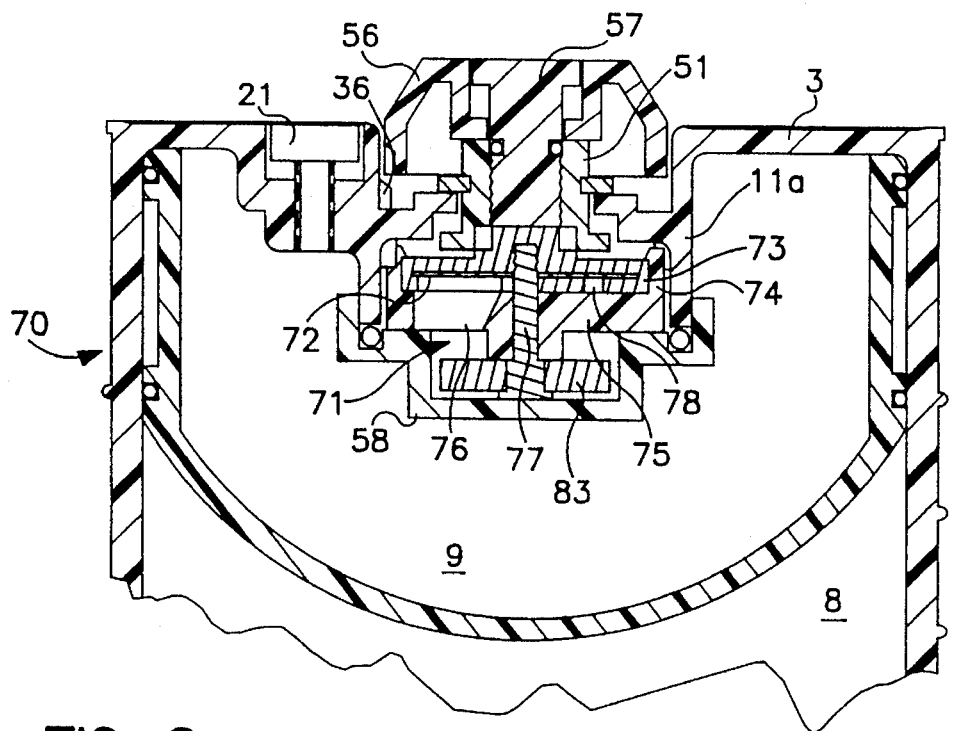
Figure 7:
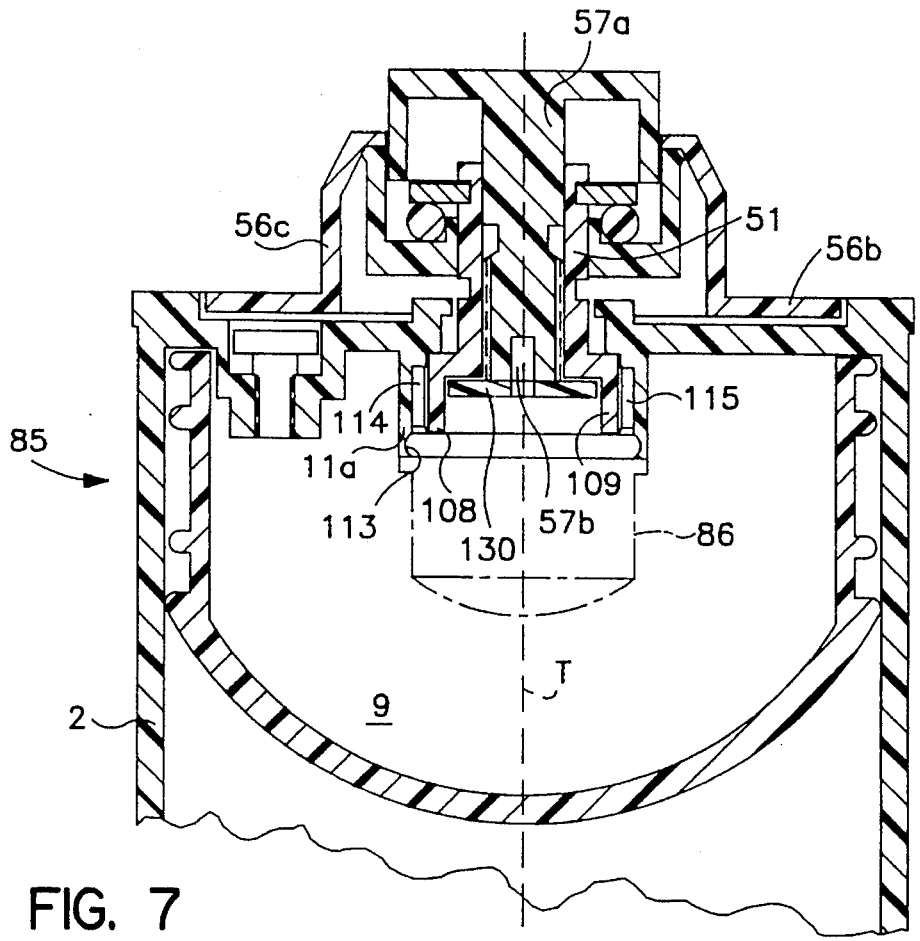
Figure 8:
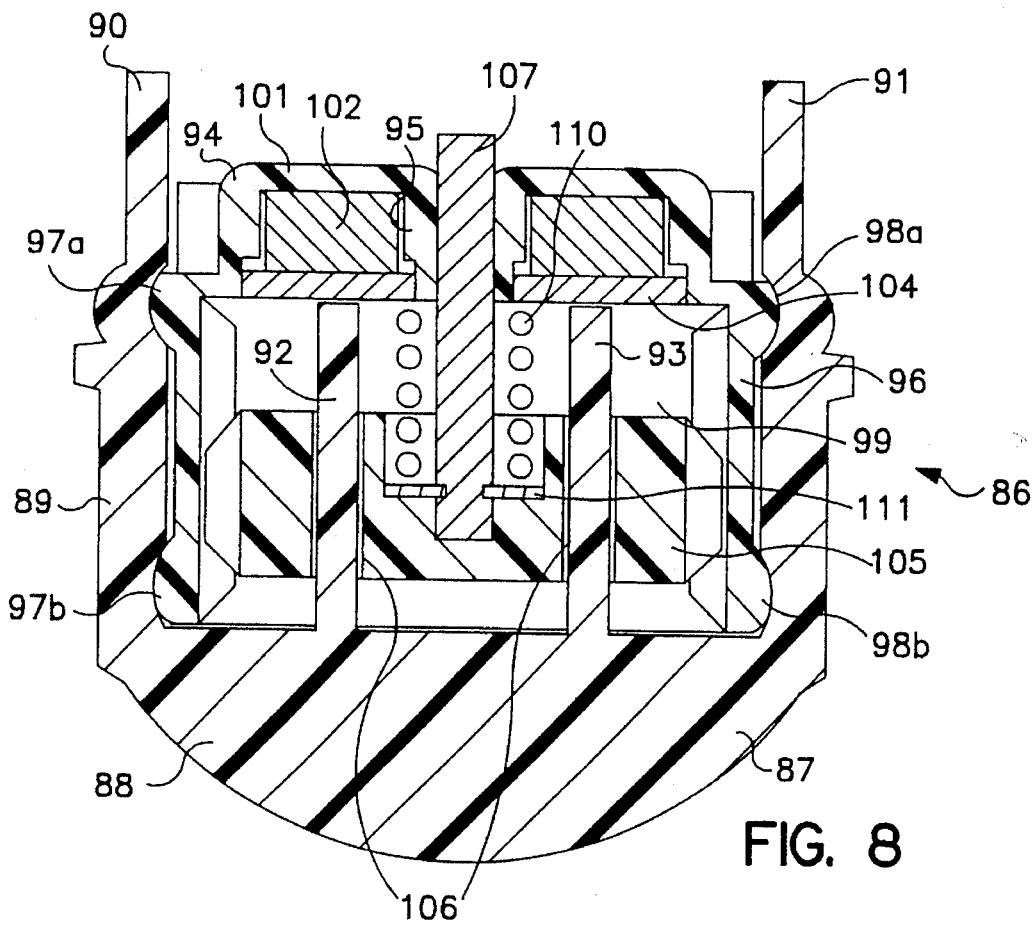
Figure 9:
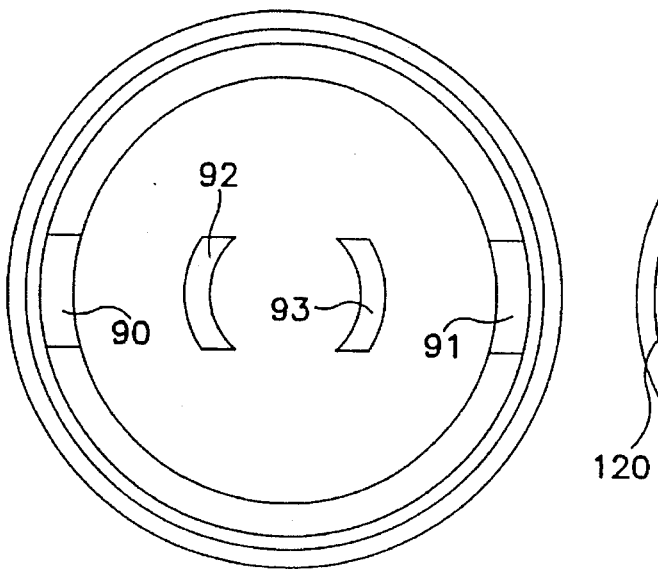
Figure 10:
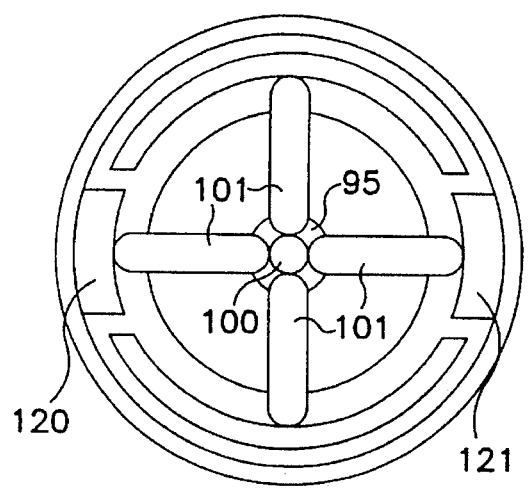
Figure 11:
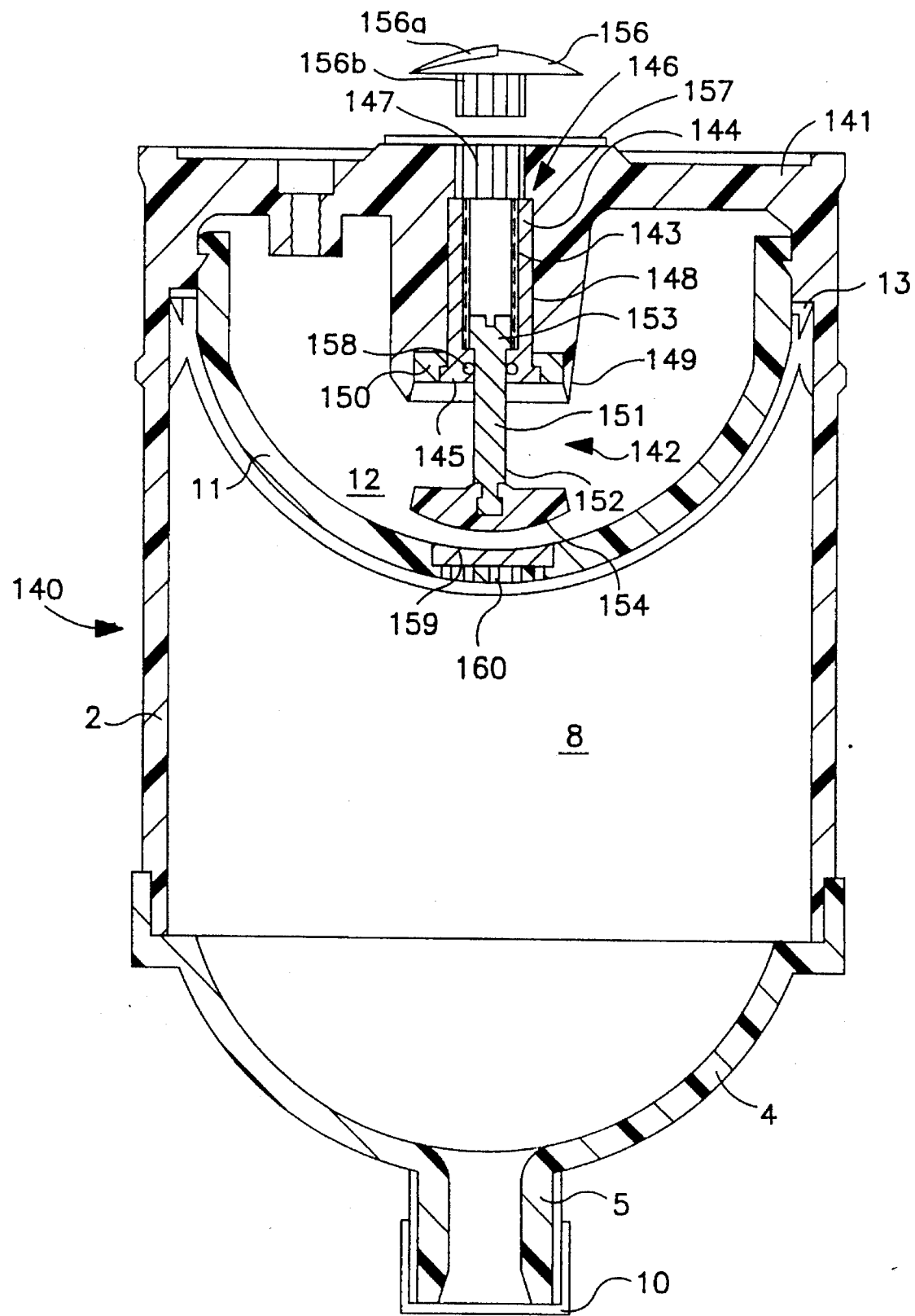
Figure 12:
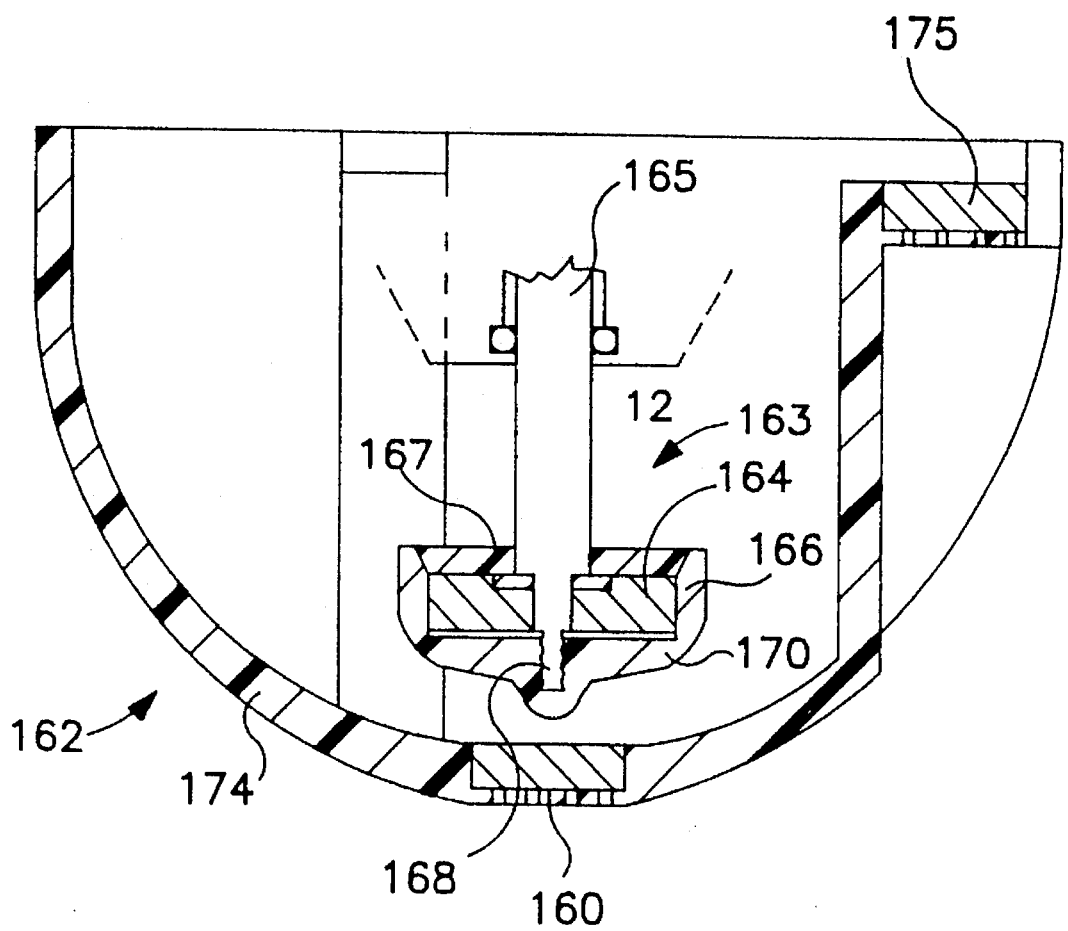
Figure 13A:
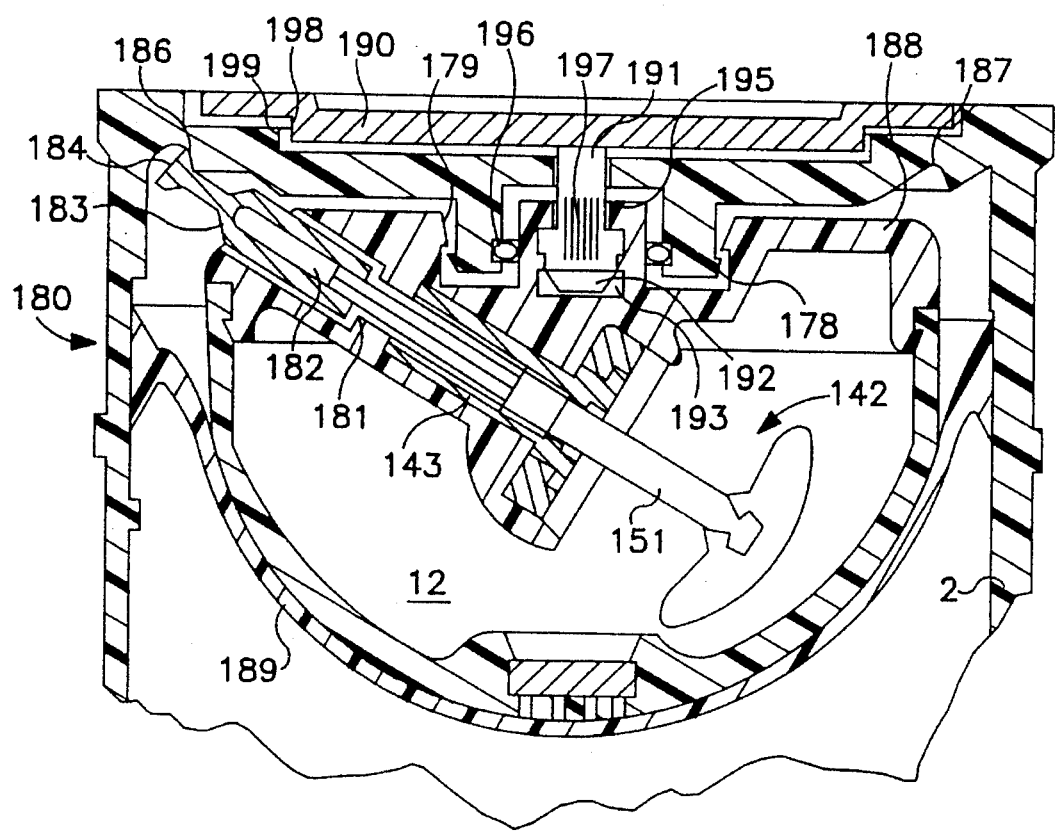
Figure 13B:
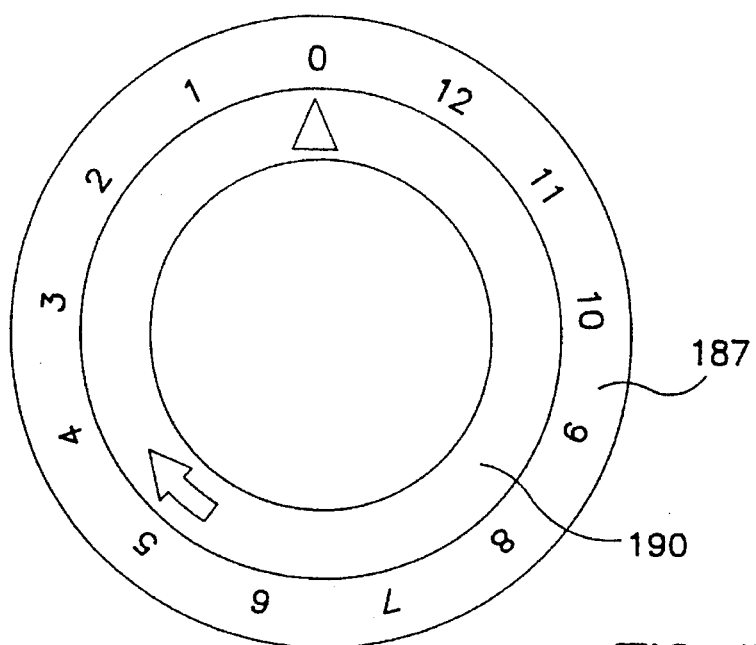
Figure 14:
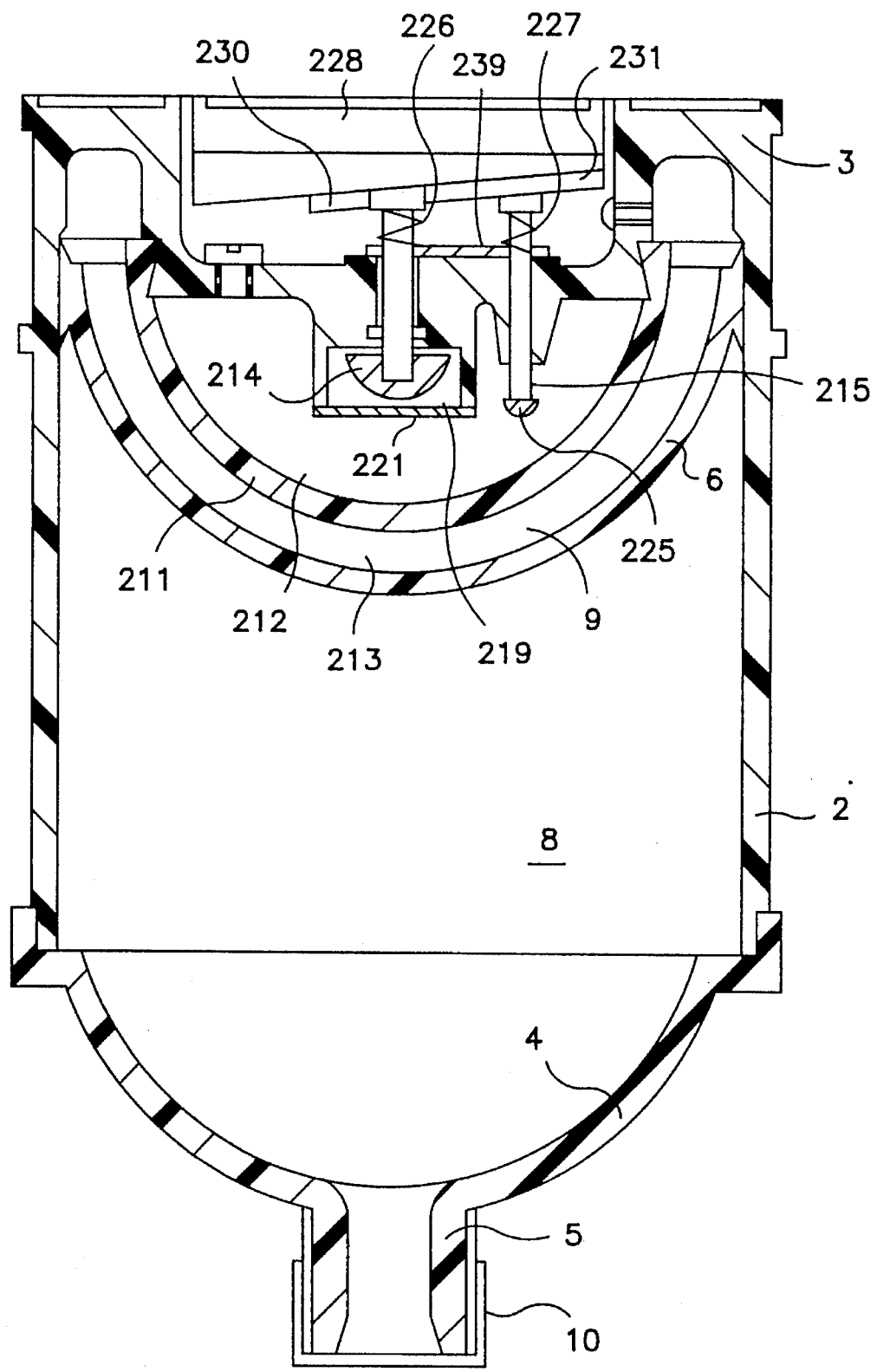

Embodiments of the invention will now be described, by way of example only, with reference to the accompanying drawings in which:

FIG. 1 is a schematic sectional view through a first embodiment of a dispensing device according to the present invention prior to insertion in a tubular passage of an actuating plug to initiate activation of the device, FIG. 2 is a view of the device shown in FIG. 1 with the actuating plug partially inserted into the tubular passage, FIG. 3 is a view of the device shown in FIG. 1 with the actuating plug fully inserted into the tubular passage so that an electrode unit, previously retained in the tubular passage, is ejected into an electrolyte-containing chamber of the dispensing device, FIG. 4 is an enlarged schematic sectional view of the upper end of the device shown in FIG. 1, FIG. 5 is a schematic sectional view through a second embodiment of a dispensing device according to the present invention, FIG. 6 is a schematic sectional view through a third embodiment of a dispensing device according to the invention, FIG. 7 is a sectional view through an upper part of a fourth embodiment of a dispensing device according to the invention, FIG. 8 is a sectional view on an enlarged scale of an electrode unit for use with the dispensing device shown in FIG. 7, FIGS. 9 and 10 are views from above on enlarged scales of housing parts of the electrode unit shown in FIG. 12, FIG. 11 is a schematic sectional view of a fifth embodiment of a dispensing device according to the invention, FIG. 12 is a schematic view of part of a sixth embodiment of a dispensing device according to the invention, FIG. 13A is a schematic sectional view of part of a seventh embodiment of a dispensing device according to the invention, FIG. 13B is an end view of the dispensing device shown in FIG. 13A, and FIG. 14 is a schematic sectional view of an eighth embodiment of a dispensing device according to the invention.

FIG. 1 shows a dispensing device 1 according to the invention for automatically dispensing lubricant over an adjustable period of time. The device 1 comprises a transparent or translucent plastics casing comprising an integral cylinder 2 and end wall 3 and a cup-shaped end part 4 fixed to the cylinder 2 and having an externally screw-threaded discharge outlet 5 sealed by an end cap (not shown). A piston device 6 is positioned within the cylinder 2 and comprises a plastics support 6a and a flexible rubber diaphragm 6b which seals against the inner surface of the cylinder 2. The piston device 6 divides the cylinder into a lower or forward first chamber 8 containing a lubricant to be dispensed and an upper or rearward second chamber 9 containing a liquid electrolyte.

An internally screw-threaded tubular passage 11 is formed coaxially in the end wall 3 and an electrode unit 12 is positioned, in a snap-fit connection, at the lower end of the tubular passage 11 to block the latter and prevent the electrolyte contained in the second chamber 9 from passing through the tubular passage 11.

The electrode unit 12 (see FIG. 4) comprises a flat electrode, in the form of an annular zinc disc 13, arranged at the bottom of a cylindrical molybdenum rod 14 constituting a second electrode. The annular disc 13 is positioned within a non-electrically conducting plastics container 15 having connection means, e.g. a snap-fit or screw-threaded connection, into which a lower portion of the rod 14 is engaged. An electrically conductive but galvanically unreactive annular disc 16, e.g. a tinned metallic washer, is positioned between the bottom of the disc 13 and the bottom of the opening in the container 15 in which the disc 13 is received. This disc 16 contacts both the molybdenum rod 14 and the zinc disc 13 so that the rod 14 is electrically connected to the disc 13.

The end wall 3 is provided with an electrolyte filling and venting opening 20 closed by a screw member 21.

The device 1 further includes a plug, generally designated 23, comprising a one-piece plastics moulding 24, a plastics sleeve 25 closed at its upper (as viewed in the Figures) end and open at its lower end, an open-ended tubular sleeve member 26 and arcuate shroud parts 27 circumferentially positioned between the sleeve 25 and sleeve member 26. The plastics moulding 24 comprises a cylindrical body part 33 with a handle 28 extending upwardly from one end and, extending downwardly from its other end, a cylindrical central portion 29 and an externally screw-threaded outer annular portion 30 spaced from the central portion 29 to provide an annular gap 31 in which the tubular sleeve member 26 is slidably received. The upper end of the sleeve member 26 has an annular bead on its outer surface which is received in an annular recess at the lower or outer end of the inner surface of the annular portion 30 to retain the sleeve member 26 in an extended end position in a snap fit. The plastics sleeve 25 is supported at its lower end by the arcuate shroud parts 27 positioned coaxially between the lower end of the sleeve 25 and the lower end of the sleeve member 26. As can be more clearly seen in FIG. 4, the inner or upper ends of the shroud parts 27 are prevented from axial movement by interengaging with the end of the central portion 29. The outer or lower ends of these shroud parts 27 are urged resiliently outwards but are contained by the surrounding sleeve member 26.

The sleeve 25 has one or more calibrated openings 35 in its cylindrical surface. A sealing ring 36 is positioned at the upper end of the annular surface of the cylindrical body part 33.

In use, the plug 23 is positioned at the entrance to the tubular passage 11 and the sleeve 25 is pushed down, in an interference push fit, onto the rod 14 so that the lower end of the sleeve member 26 engages, in the extended end position of the latter, the lower annular end of the tubular passage 11. The plug 23 is then screwed into the tubular passage 11, until the shroud parts 27 contact the disc 13 (see FIG. 2) and the sleeve member 26 moves relatively upwardly within the annular gap 31 from its extended position. Continued screwing of the plug into the tubular passage 11 causes the central portion 29 to urge the shroud parts 27 against the electrode disc 13 until the electrode unit 12 is pushed out of its snap-fit engagement within the tubular passage 11. As the sleeve member 26 moves into a retracted position within the annular gap 31, the shroud parts 27 lose their radially outer support and spring apart at their lower ends so as to no longer support the sleeve 25. The electrode unit 12 with the sleeve 25 fitted to the rod 14 fall into the second chamber 9. The plug 23 is finally fully screwed into the tubular passage 11 (see FIG. 3) so that the sealing ring 36 makes sealing contact between an annular seating surface 40 of the tubular passage 11 and the cylindrical body part 33.

The contact of the electrodes of the electrode unit 12 with the electrolyte contained in the second chamber 9 causes gas to be electrochemically generated. As gas is generated in the second chamber 9, the piston device 6 moves downwardly dispensing the lubricant contained in the first chamber 8 through the outlet 5. The rate of gas generation is determined by the area of the rod 14 exposed for contact with the electrolyte which is determined by the size of the calibrated openings 35. In practice a number of colour coded plugs 23 are provided each carrying a sleeve with differently calibrated openings 35 depending on the length of time that it is required for the dispenser to operate, e.g. 3 months, 6 months or 1 year. These plugs 23 are made of moulded plastics components which are relatively inexpensive to manufacture. Only one electrode unit 12 containing the relatively expensive galvanic elements is required for each dispensing device.

Since the walls of the casing of the device 1 are transparent or translucent, the position of the piston device 6 can be viewed from the outside. If required the wall of the casing may be calibrated with a scale 49 or the like to facilitate reading how far the piston device has travelled and how much lubricant remains to be dispensed.

It will be appreciated that any suitable electrolyte may be provided in the second chamber 9. Typically, however, the electrolyte comprises citric acid possibly with the addition of a detergent or wetting agent and a freezing point lowering agent. The two electrodes of the electrode unit must be of different galvanically active metallic or other materials. Although the preferred material for the disc 13 is zinc and for the rod 14 is molybdenum, other materials may be used. For example, the electrode disc 13 may comprise aluminium and the electrode rod 14 may comprise stainless steel.

FIG. 5 illustrates another embodiment of a dispensing device, generally designated 50, according to the invention. Where possible similar parts of the devices 1 and 50 have been identified by similar reference numerals and will not be described in detail.

The device 50 has an end wall 3 with a tubular passage 11a leading to an electrolyte-containing second chamber 9. An internally screw-threaded sleeve 51 having a flange 52 at its lower end is rotatably mounted within the passage 11a. An O-ring seal 53 is located between the flange 52 and the lower surface of a radially inwardly extending annular wall portion 54 at the upper end of the passage 11a and a circlip 55, fixed to the sleeve 51, abuts against an upper surface of the annular portion 54. A rotatable knob 56 is mounted on the upper end of the sleeve 51 and a screw-threaded ejecting member 57 is screwed into the sleeve 51. The knob 56 has splines 56a cooperating with splines on the outer surface of the sleeve 51 to enable the knob to move axially but not rotatably, with respect to the sleeve 51. The enlarged head of the ejecting member 57 ensures that the knob 56 cannot slide upwardly off the sleeve 51 whilst the ejecting member is in screw-threaded engagement with the sleeve. The lower end of the passage 11a is closed by a closure member 58 in a snap-fit connection.

A chamber or cavity 59 is defined in the tubular passage 11a between the closure member 58 and the sleeve 51. In this cavity is received an electrode unit 60 comprising a flat, metallic electrode 61, e.g. in the form of a zinc disc, electrically connected by an electrically conductive but galvanically unreactive bolt 62 to a cylindrical electrode 63 of a different metal, e.g. molybdenum. The cylindrical electrode 63 is fixed within a cylindrical plastics cap 64 having a cylindrical wall 64a, which closely covers the cylindrical surface of the electrode 63, and an end wall portion 64b which covers the upper end surface of the cylindrical electrode 63. The end wall portion 64b has an upwardly projecting part which projects into the sleeve 51 and is keyed to the latter, e.g. by cooperating flutes, so as to be movable axially, but not turnably, relative thereto. A further cylindrical cap 65 has a cylindrical wall 65a closely surrounding the cylindrical wall 64a and an end wall 65b which covers the lower end surface of the electrode 63 and which is turnably mounted on the bolt 62. The cap 65 is keyed to the tubular passage 11a, e.g. by means of cooperating flutes, to prevent rotational movement, but to allow axial movement, of the cap 65 relative to the tubular passage. The sleeve 51, knob 56, ejecting member 57, cylindrical walls 64a and 65a, electrodes 61 and 63 and bolt 62 all share a common longitudinal axis 69.

The cylindrical wall 64a is provided with a plurality of angularly spaced apart, differently sized openings 66 exposing different areas of the electrode 63. The cylindrical wall 65a is provided with a single, large opening 67, typically having a size similar to the largest opening 66.

In use, prior to activation of the device 50, the rate of gas production in the activated device 50 is pre-set by turning the knob 56 so as to turn the sleeve 51 within the tubular passage 11a. Since the sleeve 51 is keyed to the cap 64, the latter turns with the sleeve 51. However, the cap 65 is prevented from turning since it is keyed to the tubular passage 11a. Thus the cylindrical wall 64a is turned within the surrounding, coaxial cylindrical wall 65a so that different ones of the openings 66 can be placed in registry with the opening 67. In this way different parts of the cylindrical surface of the electrode 63, each of different surface area, are exposed through the opening 67, all other surfaces of the electrode 63 being covered by the caps 64 and 65. There is an interference fit between the cylindrical walls 64a and 64b to prevent the ingress of electrolyte therebetween when the electrode unit is subsequently immersed in the electrolyte whilst allowing relative turning between the caps 64 and 65.

After the caps 64 and 65 have been turned relative to each other into a pre-set condition—i.e. for generation of gas at a desired rate so that the dispensing device 50 will dispense material, e.g. lubricant such as oil or grease, over a desired period of time—the electrode unit 60 is dispensed into the second chamber 9. This is achieved by screwing the ejecting member 57 downwardly so that the electrode unit 60 is pushed downwardly. As the ejecting member 57 is screwed axially downwards, radially outwardly extending longitudinal flutes 56b on the knob 56 cooperate with radially inwardly extending longitudinal flutes 3b formed in an opening of the end wall 3 so as to lock the knob 56 against rotation thereby preventing alteration of the pre-setting of the caps 64 and 65. Furthermore, the electrode unit 60 is pushed axially downwards against the closure member 58 forcing the latter to become detached from the lower end of the tubular passage 11a so that the electrode unit 60 can fall into the chamber 9. Alternatively, if the device 50 is inverted in use, electrolyte from the chamber 9 can flow into the tubular passage 11a. In either case, the ejecting member 57 has an O-ring seal 68 which seals with the sleeve 51 to provide a liquid-tight seal.

When the electrode unit 60 is immersed in the electrolyte, gas generation commences and the piston device 6 moves downwardly to commence dispensing of the lubricant. The interference fit between the cylindrical walls 64a and 65a ensures that they remain in their pre-set condition throughout the electrochemical reaction.

FIG. 6 shows an alternative construction of dispensing device 70 similar to the device 50 but provided with a different electrode unit 71. Where possible similar reference numerals have been employed to identify parts similar to those of the other dispensing devices described herein.

The electrode unit 71 comprises a disc-shape electrode 72 fixed within a plastics covering member 73 having a plurality of differently sized openings 78 therein. The covering member 73 is rotatably mounted within a plastics cylindrical member 74 having an end wall 75 with a large opening 76 therein. An electrically conducting, galvanically inactive pin 77 connects electrode 72 to another electrode 83. The member 73 is keyed against rotation, e.g. by longitudinally and radially inwardly extending flutes thereon cooperating with longitudinally and radially outwardly extending flutes of the sleeve 51 and the member 74 is keyed against rotation, e.g. by longitudinally and radially outwardly extending flutes on the member 74 cooperating with longitudinally and radially inwardly extending flutes of the tubular passage 11a.

In order to pre-set the electrode unit 71, the knob 56 is turned so as to turn the covering member 73 relative to the cylindrical member 74 to selectively place different ones of the openings 78 in registry with the opening 76. As with the device 50, the electrode unit 71 is ejected into the second chamber 9 by screwing the ejecting member 57 downwardly into the sleeve 51 so as to lock the control knob in position and to disconnect the closure member 58 from the tubular passage 11a.

The two dispensing devices 50 and 70 provide accurate and reliable pre-settings of the length of time of operation of the devices. At the same time the methods of ejecting the electrode units into the second chamber is reliable. The piston 6 for each device 50 and 70, comprises a rigid moulded plastics having a pair of axially spaced apart O-ring seals 80 and 81 which seal against the inside of the cylinder 2.

FIGS. 7 to 10 show another embodiment of a dispensing device 85 according to the invention. Where possible similar reference numerals have been used to identify parts similar to those of the dispensing device 50. The lower part of the cylinder 2 and end part 4 are not shown but are similar to the dispensing devices shown in FIGS. 5 and 6.

The dispensing device 85 has an electrode unit 86 (shown fully in FIG. 8 but only partly in chain lines in FIG. 7) partly within a cavity defined by the tubular passage 11a. The electrode unit 86 comprises a lower housing part 87 having a bottom wall 88, and a cylindrical wall 89 having a pair of upstanding posts 90 and 91. A further pair of posts 92 and 93 extend upwardly from the bottom wall 88. The posts 90 to 93 are diametrically aligned as can be seen in FIG. 9, although the outer posts 90 and 91 project upwardly further than the inner posts 92 and 93. An upper housing part 94 is rotatably connected to the lower housing part 87 and comprises a cylindrical wall 96 and, at its upper end, a central boss 95 with a hole 100 (see FIG. 10) therethrough which is joined to the wall 96 by four equally spaced apart radial arms 101. The wall 96 is internally screw-threaded and is positioned concentrically, radially inside, the wall 89. The wall 96 has upper and lower circumferential projections 97a and 97b in snap-fit connection with upper and lower circumferential recesses 98a and 98b in the wall 89.

A first electrode in the form of an electrode disc 102 with an axial central opening is fixed within the upper housing part 94 with the radial arms 101 positioned above it and the central boss 95 positioned within its central opening. A sealing plate 104 of a conductive but galvanically inactive material, e.g. tinned metal, with a central opening is positioned beneath, and in contact with, the electrode disc 102; the plate 104, bottom wall 88 and cylindrical walls 89 and 96 together defining a sealed cavity 99.

Within the cavity 99 is positioned a non-conductive, e.g. plastics, carrier 105 having an external screw-threaded surface in screw-threaded engagement with the internally screw-threaded surface of the wall 96. The carrier 105 has two diametrically arranged holes 106 therein through which extend the posts 92 and 93. A second electrode in the form of a cylindrical electrode pin 107 is carried coaxially on the carrier 105 and projects upwardly through the central hole in the plate 104 and the hole 100 in the boss 95. The electrode pin 107 has a liquid tight, sealing fit within the hole 100. On rotation of the upper housing part 94 relative to the lower housing part 87 about turning axis T, the screw-threaded engagement of the carrier 105 with the wall 96 causes the carrier 105 to move axially within the cavity 99. Thus the distance that the electrode pin 107 projects upwardly through the hole 100 can be adjusted. Electrical contact between the first and second electrodes is ensured by means of a metallic helical spring 110 which surrounds the electrode pin 107 and extends between the plate 104 and a conductive circlip 111 fixed to a bottom part of electrode pin 107. Alternatively, to reduce the number of electrical connections, the plate 104, circlip 111 and spring 110 could be replaced by electrically conductive, galvanically neutral, springy electrical contacts (not shown but typically two would be provided) connecting the electrode disc 102 to the electrode pin 107. In this case the electrode disc 102 would be housed in a compartment closed at the bottom except for openings through which parts of the spring contacts project. The spring contacts would be located at the bottom of this compartment except for the projecting parts which would extend through the bottom of the compartment and resiliently contact the cylindrical surface of the electrode pin 107.

The electrode unit 86 is detachably fixed within the tubular passage 11a by a circumferential rib 112 at the top of the lower housing part 87 which makes a snap-fit connection with a co-operating circumferential recess 113 at the bottom of, on the inner surface of, the tubular passage 11a. To prevent turning of the housing part 87 relative the tubular passage 11a, the upstanding posts 90 and 91 are received in downwardly open recesses 114 and 115 in the tubular passage 11a.

The upper housing part 94 has upwardly open recesses 120 and 121 (see FIG. 10) in which are received downwardly extending legs 108 and 109 of the sleeve 51 to cause the upper housing part 94 to turn relative to the lower housing part on turning of the sleeve 51. The sleeve 51 is turned itself by turning the actuating knob 56c which is keyed to the sleeve 51 by cooperating flutes (not shown). Thus by turning the knob 56c, the sleeve 51 is turned which turns the upper housing part 94 relative to the lower housing part 87 causing the carrier 105 to move axially within the cavity thereby changing the amount by which the electrode pin 107 projects through the hole 100. A peripheral flange 56b of the knob 56c and the adjacent peripheral part of the end wall 3 suitably have markings to indicate the setting of the device, i.e. the length of a prolonged period of time that the device will continue to dispense lubricant after activation of the device.

The dispensing device 85 is activated by turning a screw-threaded ejecting member 57a to eject the electrode unit 86 into the second chamber 9. The member 57a is externally screw-threaded on its central core and is in screw-threaded engagement with an internally screw-threaded bore of the sleeve 51. The lower end of the member 57a has a blind axial hole 57b therein to accommodate the electrode pin 107 when the latter projects through the hole 100, the length of the hole 57b being sufficient to accommodate the pin 107 when the latter projects its maximum distance. On screwing the member 57a downwardly, the lower end of the member 57a pushes downwardly against a plastics thrust plate 130 which transfers a downward force to the upper housing part 87. This causes the electrode unit 86 to become detached from its connection with the tubular passage 11a so that it is ejected into the second chamber 9.

Another embodiment of dispensing device according to the invention is shown in FIG. 11 and is identified by the reference 140. Where possible, the same reference numerals have been used to identify similar parts of previously described devices.

The dispensing device 140 has an end wall 141 in which is mounted an electrode assembly generally designated 142. The electrode assembly comprises a sleeve 143 of tinned brass or copper having an internally threaded upper (as viewed in FIG. 11) portion 144 and a non-threaded flanged lower portion 145. An annular zinc disc 150 constituting a first electrode, is arranged at the lower end of the sleeve 143, the latter projecting through the central opening of the annular disc 150. As can be seen in FIG. 11, the upper portion 144 of the sleeve is received within an intermediate portion 148 of a through bore 146 formed in the end wall and having a counterbored lower portion 149 and a grooved upper portion 147. The annular disc 150 is secured in the lower bore portion 149. The electrode assembly 142 further comprises a molybdenum rod 151 forming a second electrode and having a cylindrical lower portion 152 and an externally threaded upper or head portion 153 screw-threadedly engaged with the threaded upper portion 144 of the sleeve 143. The rod 152 is thus electrically connected to the disc 150 through the sleeve 143. A plastics cover 154 is attached to the lower end (as viewed in FIG. 11) of the rod 151. The bore 146 is closed by a cap 156 having a short splined shaft 156b received in interengaging relationship with the grooved upper bore portion 147. The spline and groove interengagement allows the axial removal and insertion of the cap 156 from the bore 146 but prevents turning of the cap relative to the bore. The cap 156 has a radially outwardly directed pointer 156a on its upper surface and a series of numbers from "0" to "12" are arranged circumferentially on a scale 157 on the upper surface of the end wall 141 radially outwardly of the cap 156. An O-ring seal 158 is retained within an inwardly opening annular groove of the lower portion 145 for sealing against the lower rod portion 152 and preventing the passage of either electrolyte or gas from the sub-chamber 12 between the sleeve 143 and rod 151.

In use of the dispensing device 140, the cap 156 is removed from its closure position in the bore 146 and a screwdriver or the like is inserted through the bore portion 147 and inside the sleeve 143 to rotate the head portion 153. Initially the rod 151 is in an uppermost position (as viewed in FIG. 11) with the cover 154 covering the annular disc 150. In this respect it will be noted that the cover has frusto-conical walls which are intended to seal against corresponding frusto-conical walls of the end wall 141 surrounding the disc 150. In the uppermost position of the rod 151, the disc 150 and rod 151 are not exposed to contact with the electrolyte contained in the sub-chamber 12. On rotation of the head portion 153 in a clockwise direction the rod 151 moves downwardly. As the rod moves downwardly, the cover 154 reveals both the disc 150, and an increasing length of the lower portion 152, to contact with the electrolyte contained in the sub-chamber 12 thus initiating the electrochemical generation of gas. Conveniently, from the uppermost position of the rod 151, a single clockwise rotation of the head portion 153 will provide for 12-month operation of the device, two clockwise rotations of the head portion will double the rate of gas generation and thus halve the operation period so that the device operates for 6 months. It follows that 4-month operation will require three clockwise revolutions, 3-month operation will require four clockwise revolutions and 2-month operation will require six clockwise revolutions. For 1-month operation, the rod 151 will be in its lowermost position reached by twelve full rotations of the head portion 153. If appropriate gearing (not shown) were provided, it is possible that the device could be designed so that there was a direct relationship between the number of revolutions turned and the length of operation of the device. Once the desired operational time period has been set by the user, the cap 156 is pushed back into the bore 146 but oriented so that the pointer 156a is directed towards the figure on the scale 157 identifying the number of months of operation of the dispensing device. Typically the rod 151 will have a length of travel of about 10 mm between its upper and lower positions and the exposed portion of the rod 151 will have a diameter of about 2 mm. The diameter dimension for the rod is very critical for particular combinations of electrolytes and electrodes and can be calculated in theory and verified by experiment for any particular electrolyte/electrode combination. The cup-shaped member 11 is typically made of gas-impermeable and electrolyte-impermeable material. In this case, plugs 159 of gas-permeable and electrolyte-impermeable material may be fixed in the walls of the member 11. As shown in FIG. 11, one such plug 159 is shown in the member 11 with the portion of the member 11 beneath the plug 159 having through openings 160 formed therein. Normally more than one plug 159 is provided, but the plug 159 shown would operate to allow gas generated in the sub-chamber 12 to pass to the sub-chamber 13 if the device 140 were used in an inverted condition. In that case, since the sub-chamber 12 is never completely filled with electrolyte, a gas space would be provided above the upper surface level of electrolyte contained in the inverted dispensing device and gas in this gas space would be able to pass through the plug 159 into the sub-chamber 13.

A modified version of the dispensing device 140 is schematically shown in FIG. 12 and is identified by the reference number 162. The main differences between the dispensing devices 140 and 162 are in the cup-shaped member, identified by reference numeral 174 in FIG. 12, defining in part the sub-chamber 12 and the electrode assembly 163. Only these items will be described in detail below.

The dispensing device 162 has an electrode assembly generally designated by the reference 163. The electrode assembly 163 comprises an annular zinc disc 164 constituting a first electrode arranged at the bottom of a molybdenum rod 165 constituting a second electrode. The annular disc 164 is positioned within a non-electrically conducting plastics container 166 having a screw-threaded bore into which a lower portion 168 of the rod 165 is screw-threadedly engaged. An electrically conductive but galvanically inactive annular disc 170, e.g. a tinned metallic washer, is positioned between the bottom of the disc 164 and the bottom of the opening in the container 166 in which the disc 164 is received. This disc 170 contacts both the molybdenum rod 165 and the zinc disc 164 so that the rod 165 is electrically connected to the disc 164. Although means are not shown for effecting upward and downward movement of the electrode assembly 163, any suitable mechanical means may be provided. The mechanical arrangement may involve rotating inclined camming surfaces, gearing arrangements operable on turning or rotation of a control knob or a simple screw-threaded arrangement such as is shown in FIG. 2. Whatever mechanical means is employed, the rod 165 is moveable between an upper position in which the disc 164 is positioned against a downwardly facing annular surface 172 of the end wall 3 and a lower position (as shown in FIG. 12). Typically the length of rod 165 exposed in the lower position of the electrode assembly is about 10 mm and this length of rod would suitably be used for lubricant dispensing over a period of one month. A shorter length of rod 165 would be exposed for longer periods of time for lubricant dispensing. Since the rod 165 is cylindrical in form, there is a substantially linear relationship between the length of rod 165 exposed to contact with the electrolyte and the rate of gas generation. To prevent or defer erosion of the disc 164 where it is joined to the rod 65, a plastics annular disc 167 is positioned in a coaxial recess formed in the upper surface of the disc 164 and positioned against the rod 165. Alternatively, the disc 167 may be replaced by an annular sleeve (not shown) extending the full height of the disc 164 between the disc 164 and rod 165.

The cup-shaped electrolyte containing member 174 is provided with a gas-permeable, electrolyte-impermeable lower plug 160 positioned co-axially of the casing of the dispensing device 162. In addition to the plug 160, a plurality, e.g. three or more, further plugs 175 (only one of which is shown in FIG. 12) are positioned around the upper periphery of the cup-shaped member 174. Conveniently these plugs 175 are equally angularly spaced apart and lie in a common plane perpendicular to the axis of the dispensing device.

In use, the chamber 12, defined by the member 174 and the end wall 3, is not fully filled with electrolyte. At least one of the plugs 160 and 175 is intended to be positioned above the upper level of the electrolyte for any orientation that the dispensing device 162 can be in when in its "in use" position on a machine. Thus, for example, in the orientation of FIG. 12, all the plugs 175 would normally be positioned above the upper level of the electrolyte. If the device were inverted through 180°, the plug 160 would be positioned above the level of the electrolyte. If in a horizontal disposition, one, or at least part of one, of the plugs 175 would be positioned above the level of the electrolyte. Thus, gas generated within the sub-chamber 12 is able to pass through at least one of the plugs 160 and 175 into the chamber 13 for effecting movement of the piston device 6 to dispense lubricant through the discharge outlet 5.

FIGS. 13A and 13B illustrate a further embodiment of a dispensing device according to the invention and generally designated by the reference numeral 180.

In the dispensing device 180, the electrode assembly 142 is similar to that shown in FIG. 11 and similar parts of the electrode assembly have been identified by the same reference numerals. However, it will be appreciated that the electrode assembly is disposed at an angle, typically about 60°, to the axis of the dispensing device 180. In order to effect movement of the rod 181 into and out of the sub-chamber 12, a splined rod 181 extends rearwardly from the head portion 183 and a rearward portion of this splined rod 181 is received within a grooved bore 182 of a tubular member 183 having, at its rearward end, a bevel gear 184. The tubular member 183 is journalled for rotation about the axis of the rod 11 and the splined rod 181 is moveable axially within the grooved bore 182 of the tubular member 183. Rotation of the tubular member 183 thus causes the rod 181 to be screwed into or out of the sleeve 143. The bevel gear 184 meshes with teeth 186 arranged on the circumference of a circle on the downwardly facing surface of an end wall 187.

The electrode assembly 142 is mounted on a closure wall 188 which closes the upper end of a cup-shaped electrolyte containing member 189. The wall 188 and member 189 form a single unit which is rotatable about the axis of the dispensing device 180 relative to the casing of the latter. Rotation of this unit causes the bevel gear 184 to mesh with the teeth 186 thereby moving the rod 151 into or out of the sub-chamber 12 defined by the member 189 and closure wall 188. This relative rotation is effected by means of a control knob 190 (see FIG. 13B). The knob 190 has a central shaft 191 with an enlarged head 192 at its lower end (as viewed in FIG. 13A) received within an upwardly open chamber 193 formed in the closure wall 188. The knob 190 is moveable axially between a lower position (shown in FIG. 13A) and an upper position determined by the relative dimensions of the head 192 and the chamber 193. The opening into the chamber 193 in the closure wall 188 comprises a grooved bore 195. Splines 197 on the shaft 191 are engaged with the grooves of the bore 195 whether the control knob 190 is in its upper or lower positions so that rotation of the knob will cause the closure wall 188 to rotate with the knob 190 so that the bevel gear 184 rides around the teeth 186 effecting rotary and axial movement of the rod 151. Although not shown in FIG. 13A, the knob 190 has axial splines formed on its cylindrical surface 198. In the lower position of the knob 190, these splines interengage with axial grooves formed in the cylindrical surface 199 of the end wall 187 to prevent rotation of the knob 190 relative to the end wall 187. In the upper position of the knob 190, the splines disengage from the axial grooves to permit turning of the knob 190 relative to the end wall 187. When in its upper position, the knob 190 is turnable from its initial "0" position in a clockwise direction and can be positioned against any of the numbers "12" through to "1" arranged around the outside of the end wall 187. It is not possible to turn the knob 190 in a clockwise direction passed the "1" position. Once set, the control knob 190 is lowered to engage the splines on the surface 198 with the grooves in the surface 199. As can be seen in FIG. 13A, an O-ring seal 196 is provided between a cylindrical part of the closure wall 188 and a confronting cylindrical portion of the end wall 187 to prevent the escape of gas from the sub-chamber 13. The lower end of this closure wall cylindrical part has an enlarged tapered head 178 which snap fits behind an inwardly directed tapered annular projection 179 formed on the end wall cylindrical portion to retain the end wall connected to the knob 190.

A further embodiment of the invention is schematically shown in FIG. 14 and shows a cup-shaped member 211 fixed to end wall 3 which sub-divides the second chamber 9 into a first electrolyte containing sub-chamber 212 and a second sub-chamber 213 adjacent piston device 6. The member 211 is made of a rigid or semi-rigid plastics material which is permeable to gas but impermeable to the electrolyte and which conveniently comprises a microporous material, such as microporous polyethylene, polypropylene or polytetrafluoroethylene.

The end wall 3 supports a sacrifical first electrode 214 and a gas releasing second electrode 215. Each electrode is slidably mounted and is urged into an upper position, as viewed in FIG. 14, by spring means 226 and 227. The electrode 214 is received within a cavity 219 sealed at its front end by a frangible foil 221. A conductive strip 239, e.g. of copper, electrically connects the two electrodes 214 and 215.

A control knob 228 is mounted in the end 3 and is actuable to urge the electrodes 213 and 215 downwardly against the spring urging. The knob 228 has camming surfaces schematically identified as 230 and 231 which control the position of the electrodes on turning of the knob. Initial downward movement of the electrode 214 causes the foil 221 to fracture so that the electolyte contacts the electrode 214 to initiate the activation of the device. The rate of dispensing is controlled by the amount of electode 215 which projects into the sub-chamber 212. A non-conducting plastics portion 225 at the lower end of the electrode 215 prevents the electrolyte contacting the electrode 215 until the latter is advanced by sliding movement from its uppermost position.

It will be appreciated that the dispensing devices described herein enable the lubricant discharge rate to be adjusted by the user by means of a simple external mechanical adjustment. This is conveniently achieved by providing one of a variety of mechanical arrangements on the exterior of the dispensing device and preferably including a turnable control knob actuator. On activation of the device, after adjustment of the surface area of the gas-releasing electrode to be exposed to contact with the electrolyte, the sacrificial and gas-releasing electrodes contact the electrolyte. Once the position of the gas-releasing electrode has been set or adjusted, the amount of its surface area contacted by the electrolyte will not change in use of the dispensing device except in those embodiments described in which the electrolyte is retained in a gas permeable yet electrolyte impermeable chamber, and the eletrode unit remains fixed to its adjusting mechanism, thus permitting the user to re-adjust the discharge rate at any desired time after activation.

A wall portion of the end part 4 may be weakened, or the joint between the end part 4 and the cylinder 2 may not be strong, so as to fracture in use if a build up of pressure occurs within the lubricant-containing chamber, e.g. as a result of a blocked machine bearing.

I claim:

1. A dispensing device comprising cylinder means, dispensing means movable within the cylinder and separating the cylinder means into a first chamber containing fluent material and having a discharge outlet and a second chamber containing an electrolyte, a galvanic element comprising a sacrificial first electrode and a single gas-releasing second electrode electrically connected to the first electrode, the first and second electrodes being of different galvanically active materials and which, on activation of the device, are brought into contact with the electrolyte so as to electrochemically generate gas within, and increase the pressure within, said second chamber thereby causing the dispensing means to move within the cylinder means to discharge said fluent material through the discharge outlet, and adjustment means operatively connected to said second electrode for varying the amount of surface area of the second electrode of the galvanic element exposed for contact with said electrolyte; whereby the rate of gas electrochemically generated is pre-adjusted to control the time taken for the cylinder means to discharge said fluent material through the discharge outlet.

2. A dispensing device according to claim 1, wherein the adjustment means comprises an adjustment member movably mounted in an end wall of the cylinder remote from the discharge outlet and the first and second electrodes are carried by an electrode unit having relatively movable first and second housing parts movable to expose different amounts of the surface area of the second electrode, the electrode unit being positioned, prior to activation of the device, in an adjustment position in which said electrolyte in the second chamber is prevented from contacting the first or second electrodes and in which the adjustment member is movable to relatively move said housing parts to adjust the amount of the surface area of the second electrode exposed for contact with the electrolyte on subsequent activation of the dispensing device.

3. A dispensing device according to claim 2, wherein the adjustment member is turnably mounted in said end wall and said first and second housing parts of the electrode unit are turnable relative to each other about a turning axis.

4. A dispensing device according to claim 3, wherein said housing parts define a sealed cavity with an opening therein coaxial with said turning axis, the second electrode being movably mounted in the sealed cavity and projecting through the opening, by an amount which is adjustable by turning of said adjustment member.

5. A dispensing device according to claim 4, wherein said first and second housing parts have respective first and second cylindrical portions arranged concentrically with respect to the turning axis with the first cylindrical portion disposed radially inwardly of the second cylindrical portion and wherein the second electrode is elongate and is carried on a carrier with its elongate axis coaxial with said turning axis, the carrier having an external screw thread in screw-threaded engagement with an internal screw thread of the first cylindrical portion and having stop means preventing turning of the carrier relative to the second housing part, said two screw threads being coaxial with said turning axis, whereby turning of the adjustment member to turn the first housing part causing the carrier, with its screw threaded engagement with the first cylindrical portion, to move axially within said sealed cavity.

6. A dispensing device according to claim 5, wherein the sealed cavity houses a metal helical spring surrounding the second electrode and ensuring electrical contact between the first and second electrodes, the spring being contractible on axial movement of the carrier to project the second electrode through the opening.

7. A dispensing device according to claim 3, wherein the first and second housing parts cover the second electrode, the first housing part having a plurality of openings therein and the second housing part having at least one opening therein, the turning of the adjustment member causing the first and second housing parts to turn relative to each other to place different openings of the first and second housing parts in registry with each other to expose different parts of the surface area of the second electrode.

8. A dispensing device according to claim 7, wherein the first housing part has a tubular first covering portion surrounding the second electrode and the second housing part has a tubular second covering portion closely surrounding, and coaxial with, the first covering portion, the first and second covering portions including the said openings.

9. A dispensing device according to claim 7, wherein the first housing part has a flat first covering portion covering the second electrode, and the second housing part has a flat second covering portion covering the first covering portion, the first and second covering portions including the said openings.

10. A dispensing device according to claim 2, wherein the end wall has shroud means defining a cavity in which the electrode unit is at least partly housed when in its adjustment position, and wall means are detachably secured to the shroud means to prevent electrolyte from the second chamber entering the cavity prior to activation of the device.

11. A dispensing device according to claim 10, wherein the wall means is separate from the electrode unit.

12. A dispensing device according to claim 10, wherein the wall means comprise part of the electrode unit.

13. A dispensing device according to claim 10 wherein the wall means comprises said second housing part.

14. A dispensing device according to claim 10, comprising activating means actuable to displace the wall means to enable the first and second electrodes to be contacted by the electrolyte in the second chamber.

15. A dispensing device according to claim 14, wherein the activating means comprises screw means rotatable to displace the electrode unit so that the wall means is moved out of sealing engagement with walls of the third chamber.

16. A dispensing device according to claim 15, wherein the wall means is connected in a snap-fit connection and is disconnected when the screw means is screwed to exert a force on it.

17. A dispensing device according to claim 1, wherein the first and second electrodes are assembled in an electrode unit so as to block a tubular passage opening into the second chamber, and the adjustment means comprises a plug carrying a covering member, the plug being insertable into the tubular passage to plug the latter, to position the covering member so as to partially cover an exposed surface of the second electrode and to dispense the electrode into the second chamber.

18. A dispensing device according to claim 17, wherein the tubular passage and plug are provided with mating screw-threads, the plug being screwed into and out of the tubular passage.

19. A dispensing device according to claim 17 wherein the second electrode is of elongate, cylindrical form positioned coaxially with the tubular passage when the electrode unit is fixed in the tubular passage prior to activation of the device and wherein the covering member comprises a sleeve which is pushed on to the elongate electrode as the plug is inserted into the tubular passage.

20. A dispensing device according to claim 19, wherein a number of plugs are provided each carrying a differently sized sleeve, the amount of surface area of the second electrode remaining exposed being determined by selection of the desired plug/sleeve combination.

21. A dispensing device according to claim 1, wherein the second chamber is divided into a first sub-chamber containing the electrolyte and a second sub-chamber adjacent the piston device, the first and second sub-chambers being separated by a dividing wall which during use enables the passage therethrough of gas but prevents the passage therethrough of liquid electrolyte.

22. A dispensing device according to claim 21, wherein the first and second electrodes are mounted in wall means defining a wall of the second chamber and the adjustment means are actuable to adjust the position of at least said second electrode.

23. A dispensing device according to claim 1, wherein the adjustment means is actuable to advance and retract said second electrode by sliding movement to adjust the amount of the surface area of the second electrode exposed for contact with the electrolyte.

24. A dispensing device according to claim 1, wherein the adjusting means are actuable both before and after activation of the device for adjusting the amount of surface area of the second electrode exposed for contact with said electrolyte.

25. A method of lubricating a machine bearing comprising attaching to the latter a dispensing device having cylinder means, dispensing means movable within the cylinder means and separating the cylinder means into a first chamber containing lubricant and having a discharge outlet and a second chamber containing an electrolyte and a galvanic element comprising a sacrificial first electrode, a single gas-releasing second electrode electrically connected to the first electrode, and adjustment means operatively connected to said second electrode; the first and second electrodes being of different galvanically active materials and which, on activation of the device, are brought into contact with the electrolyte so as to electrochemically generate gas within, and increase the pressure within, said second chamber thereby causing the dispensing means to move within the cylinder means and discharge the lubricant through the discharge outlet, adjusting the adjustment means for a selected amount of surface area of the second electrode to be exposed for contact with the electrolyte, and activating the dispensing device to dispense the lubricant over a prolonged period of time into the machine bearing; whereby the length of said prolonged period of time is determined by the selected amount of surface area of the second electrode exposed for contact with the electrolyte.

26. A method according to claim 25, wherein the amount of the surface area of the second electrode exposed for contact with the electrolyte is adjusted prior to activation of the dispensing device.

27. A dispensing device according to claim 1, wherein:
said adjustment means includes a plurality of apertures of different sizes; whereby a selection of discrete gas-release rates is provided.

* * * * *